Figure 1:
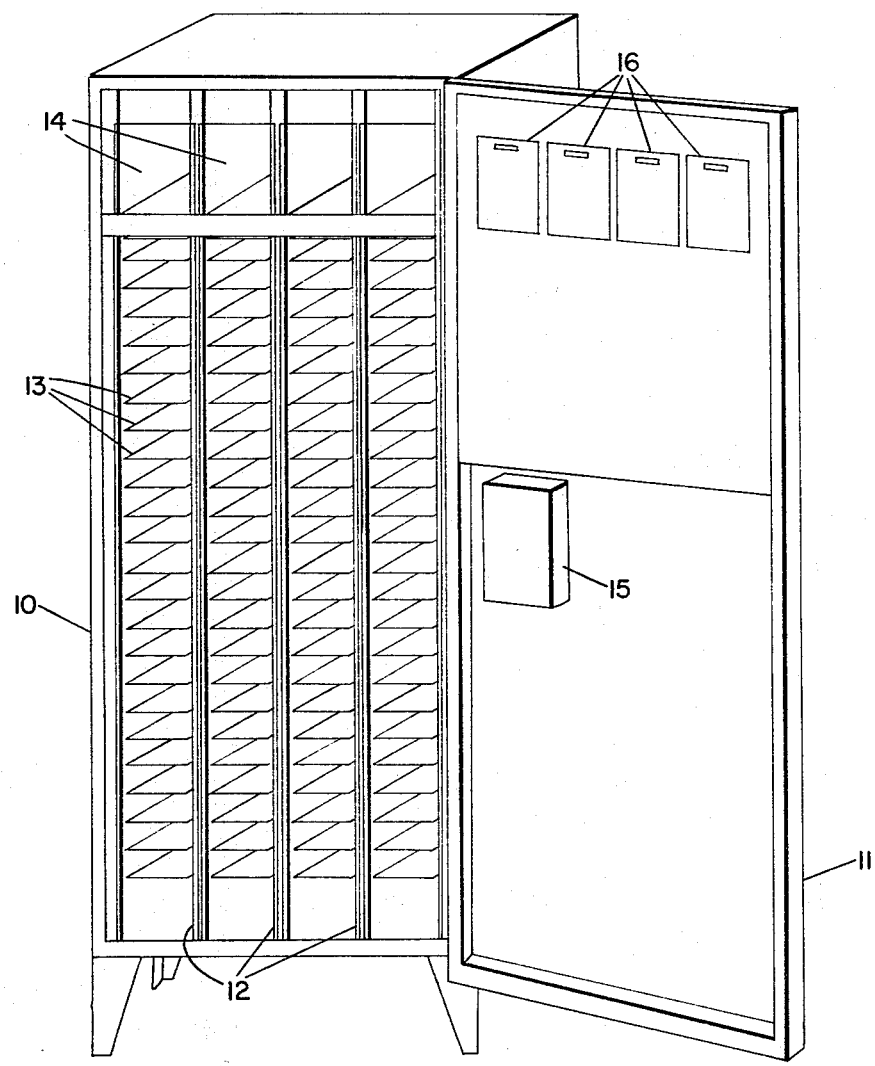

Nov. 22, 1966  E. E. CROSSLEY  3,287,074
COIN-FREED VENDING MACHINES
Filed July 29, 1964  3 Sheets-Sheet 1

INVENTOR
ERNEST ELLIS CROSSLEY
By: Norris & Bateman
Attorneys

Nov. 22, 1966   E. E. CROSSLEY   3,287,074
COIN-FREED VENDING MACHINES
Filed July 29, 1964   3 Sheets-Sheet 3

INVENTOR
ERNEST ELLIS CROSSLEY

By: Morris & Bateman
Attorneys

United States Patent Office 3,287,074
Patented Nov. 22, 1966

3,287,074
COIN-FREED VENDING MACHINES
Ernest Ellis Crossley, Ansdell, Lancashire, England, assignor to Ditchburn Vending Machines Limited, Lytham, England, a corporation of Great Britain
Filed July 29, 1964, Ser. No. 385,922
5 Claims. (Cl. 312—97)

This invention relates to coin-freed vending machines of the kind in which articles to be dispensed are disposed on a series of shelves which are brought successively into register with a delivery opening in the machine in response to the insertion of coins into the machine and operation of coin-freed mechanism. In some previously proposed machine, the shelves are arranged one above another, the delivery opening being at the bottom of the said series of shelves, and when the machine is operated, the shelves descend so as to bring the lowermost shelf bearing an article into register with the delivery opening. The shelves and delivery opening are arranged in this way because the shelves are hinged so as to project horizontally from the front run of an endless chain or the like extending between and passing around upper and lower wheels or pulleys. When a shelf is carried around the lower wheel or pulley and ascends with the rear run of the endless chain or the like, the shelf can swing about its hinge so as to hang vertically along the rear run of the chain or the like, so that the depth of the machine from front to back can be minimised. However, with this arrangement, either the shelves must be spaced apart along the length of the endless chain equal to the dimension between the shelf hinge and the outer edge of the shelf, or the shelves must be allowed to overlap one another when they are on the rear run of the chain or the like. Another disadvantage of this arrangement is that a person using the machine may have to stoop to receive articles from the delivery opening, which may have to be disposed close to the ground because, in order that the machine should be capable of containing as many articles as possible, the endless chain or the like must therefore be made as long as possible or convenient.

The present invention is designed to provide a new or improved coin-freed vending machine of the kind having shelves carried by an endless conveyor, chain or the like, in which the disadvantages referred to above can be minimised.

According to the invention, a coin-freed vending machine having shelves projecting from an endless conveyor, chain or the like, is arranged with its delivery opening adjacent to the top of the endless conveyor, chain or the like. Preferably, each shelf is articulated so that its outer portion can be caused to fold relatively to its inner portion when the shelf moves from the delivery position in the machine towards and over the top of the conveyor, whereby the space behind the conveyor only needs to be sufficient to accommodate the folded shelves which project very little more than half the length of the shelves when extended. Alternatively, the shelves may be hinged to the conveyor, so that when they are carried around the top of the conveyor, they will swing downwardly so as to lie against the conveyor along the return run of the conveyor.

Figure 2:
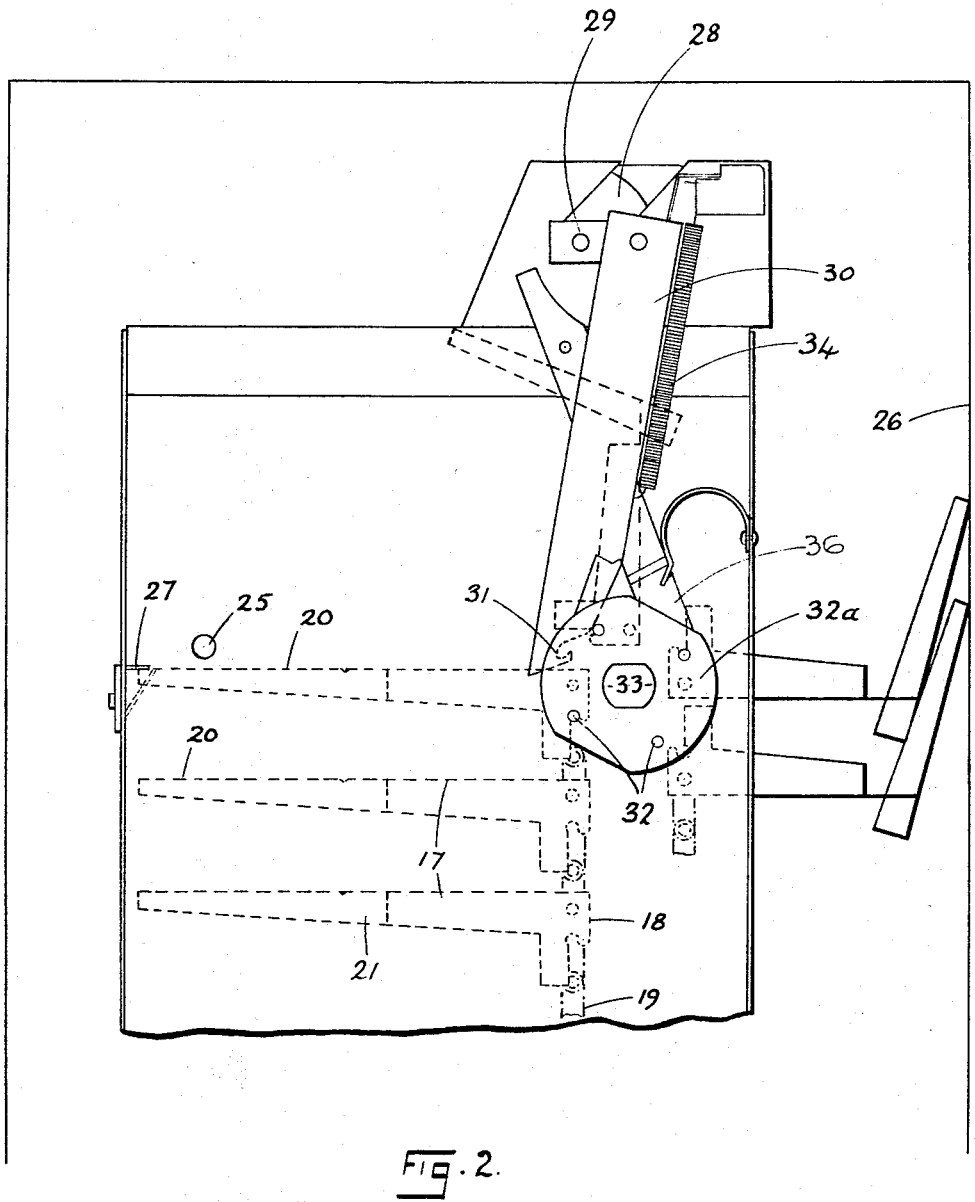
Figure 3:
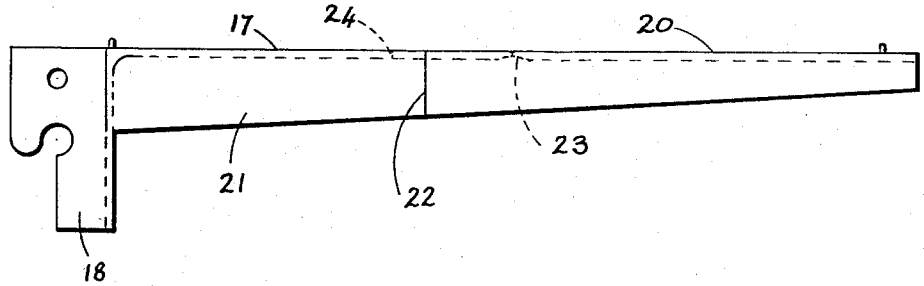
Figure 4:
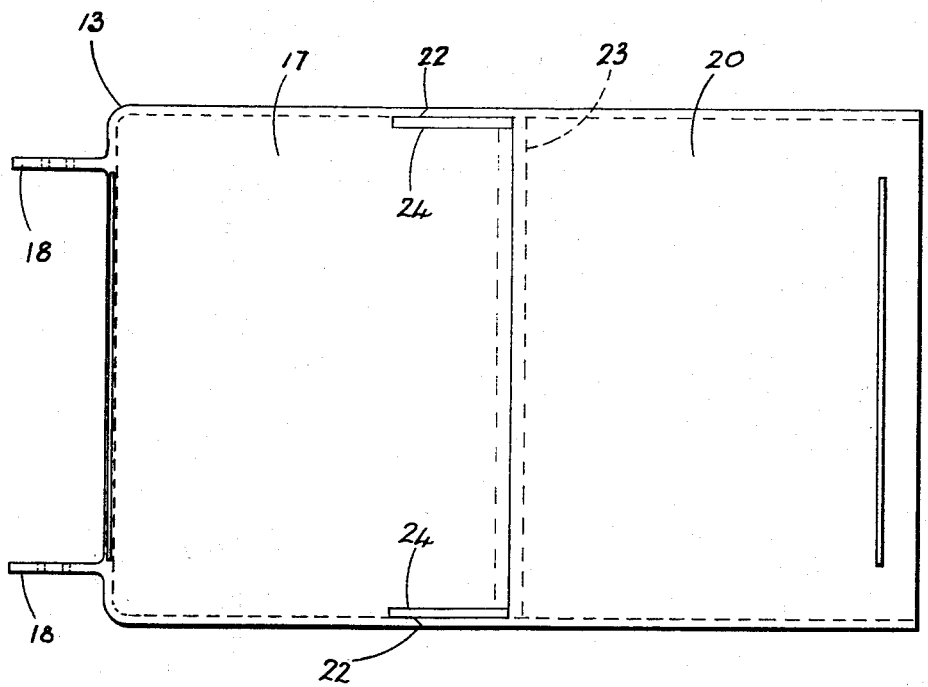

One particular arrangement of shelves for a coin-freed vending machine will now be described, by way of example only, with reference to the accompanying drawings in which:

FIGURE 1 is a perspective view of the coin-freed vending machine, with a hinged front wall in the open position, FIGURE 2 is a diagrammatic side elevation of the upper portion of an endless conveyor with shelves, incorporated in the machine of FIGURE 1, FIGURE 3 is a side elevation of one of the shelves shown in FIGURE 2, FIGURE 4 is a plan view of the shelf shown in FIGURE 3.

Referring to the drawings, the machine shown in FIGURE 1 has a casing 10, with a hinged front wall 11. There are four vertically disposed endless conveyors arranged side by side in the casing 10 and separated by vertical walls 12. Each conveyor has a series of shelves 13 projecting outwardly therefrom, and mechanism is provided for driving each conveyor in step-by-step fashion so as to bring the shelves successively to a delivery station 14 at the top of the casing.

The hinged front wall 11 carries coin-freed mechanism 15, which forms no part of the present invention, and which is adapted to control the conveyor driving mechanism to operate one conveyor through one step after a coin has been inserted into the coin-freed mechanism. The front wall 11 also has four windows 16 which can be opened from outside the machine, when the front wall is closed, to enable an article to be removed from a shelf at the delivery station.

An important feature of the present invention is in the construction of the shelves. Each shelf comprises an inner portion 17 having lugs 18 for attaching the shelf to chains 19 of the endless conveyor. The outer portion 20 of the shelf is formed integrally with the inner portion 17, the flanges 21 of the shelf being cut at 22, and the shelf platform having a groove 23 in its undersurface at the intersection between the inner and outer portions 17 and 20. This groove 23 is formed to sufficient depth as to serve as a hinge about which the outer portion 20 can be swung relatively to the inner portion 17. The cuts 22 in the flanges 21 are inclined, see FIGURE 4, and a slot 24 is formed in the inner portion 17 of the shelf alongside each flange 21, the slots extending from the hinge groove 23 beyond the cuts 22, and being sufficiently wide to enable the inwardly projecting portions of the flanges on the outer portions 20 to pass therethrough.

Normally, the outer portion 20 of each shelf will be retained aligned with the inner portion 17 by the abutting edges of the flanges 21 engaging one another at the cuts 22, but when sufficient pressure is exerted on the top of the shelf, the rearwardly projecting flanges of the outer portion will be deflected laterally into the slots 24 and the outer portion 20 will then be swung downwardly relatively to the inner portion 17. In the vending machine, the downward pressure is applied to the outer portions of the shelves by reaction of studs 25 projecting from the vertical walls 12 in the path of the shelves of each conveyor as the shelves are carried upwardly by the conveyor from the delivery station. The inclination of the cuts 22 assists in the inward deflection of the projecting portions of the flanges, and when the shelf is folded, that is, the outer portion swung downwardly about the hinge groove 23, it will be retained insuch folded position by the back wall 26 of the casing as the shelves are carried, in inverted position, down the rear run of the endless conveyor, see FIGURE 2. By arranging the shelves in folded state when carried over the top and down the back of the conveyor, space necessary to accommodate the shelves is minimised both at the top and the back of the casing.

Folding of the shelves may be initiated by an inwardly projecting flange 27 at the bottom of each window opening in the front wall. For this purpose, the conveyor is arranged so that after each stepwise movement it will stop with the outer edge of a shelf immediately beneath the flange 27, then when the conveyor makes its next stepwise movement, the outer portion of the shelf at the delivery station will be deflected downwardly by engagement with the flange 27, and when it rides past the flange, the studs 25 will complete the folding of the shelf.

The shelves may be made of any convenient material, preferably a synthetic resin from which a shelf can be moulded and then the cuts 22 and the slots 24 can be formed. In this particular example the shelves are moulded from polypropylene, but, as stated above, any other convenient material may be used.

In operation, when a coin is inserted in the coin-freed mechanism 15, this mechanism which is of known kind and operates in usual way releases locking means that normally retains the windows 16 closed. The windows 16 are mounted for sliding movements, and when unlocked, a selected window 16 can be displaced downwardly to permit a access to the delivery station and enable an article to be removed from the shelf 13 at the delivery station. The window is then closed, and as it reaches its fully closed position an electric switch is tripped to cause operation of an electric motor 28 which drives a crank 29. An arm 30 is pivotally mounted on the crank 29 and has a hook 31 adapted to engage with one of a series of pegs 32 on a disc 32ª secured on the shaft 33 at the upper end of the endless conveyor. A spring 34, having one end anchored on the machine, is connected to the arm 30 and serves to urge the arm 30 towards the pegs 32 so that the hook 31 will engage with a peg 32 as the arm 30 is being raised by the crank 29. When the arm 30 reaches its uppermost position, the motor 28 will be stopped. When next the motor 28 is operated, the hook 31 of the arm 30 will disengage from the peg 32 as the arm is moved downwardly, a latch 36 engaging with one of the pegs 32 to prevent reverse rotation of the disc 32ª. It will be seen that this mechanism provides step-by-step operation of the conveyor under the control of the coin-freed mechanism 15.

In the particular construction described above, the outer part of each shelf is adapted to fold downwardly, but it will be understood that it may be adapted to fold upwardly, in which case it will not be necessary to deflect the projecting portions of the flange, and consequently the slots 24 may be narrower than the flange.

I claim:

1. A coin-freed vending machine comprising an endless conveyor, a series of shelves projecting from said endless conveyor, means for traversing said endless conveyor in step-by-step fashion, a casing enclosing said conveyor and shelves and a delivery opening in said casing, each of said shelves having an inner portion secured to said endless conveyor and an outer portion articulated on said inner portion, means yieldable under pressure to retain said outer portion of each shelf aligned with the inner portion and stationary means in said casing for engaging and folding said outer portion downwardly relative to said inner portion as each shelf is traversed upwardly from said delivery opening in said casing.

2. A coin-freed vending machine as defined in claim 1, in which each shelf has a laterally disposed groove in one surface at the intersection between the inner and outer portions of said shelf to provide a hinge for articulation of said shelf.

3. A coin-freed vending machine comprising an endless conveyor, a series of shelves projecting from said endless conveyor, means for traversing said endless conveyor in step-by-step fashion, a casing enclosing said conveyor and said shelves and a delivery opening in said casing, said delivery opening being disposed adjacent to the top of said endless conveyor, each of said shelves being articulated to provide an outer portion that can be folded relative to an inner portion, means yieldable under pressure to retain said outer portion of each shelf aligned with the inner portion thereof, and means for folding said outer portion downwardly relative to the inner portion when each shelf is traversed upwardly from said delivery opening, said yieldable means comprising rearwardly projecting flange members on said outer portion and complementary abutting flange members on said inner portion, said rearwardly projecting flange members being of flexible material permitting lateral flexing of said flange members under pressure, and slots in each shelf for passage therethrough of said projecting flange members.

4. A coin-freed vending machine comprising an endless conveyor, a series of shelves projecting from said endless conveyor, means for traversing said endless conveyor in step-by-step fashion, a casing enclosing said conveyor and said shelves and a delivery opening in said casing, said delivery opening being disposed adjacent to the top of said endless conveyor, each of said shelves being articulated to provide an outer portion that can be folded relatively to an inner portion, each of said shelves having a laterally disposed groove in one surface at the intersection between said inner and outer portions to provide a hinge for articulation of said shelf, and stationary projections on said casing in the path of the outer portion of each shelf as the latter is moved by said conveyor upwardly from said delivery opening, whereby said projections are operable to engage with and cause the outer portion of each shelf to fold downwardly relative to said inner portion.

5. A coin-freed vending machine comprising an endless conveyor having a forward run and a rearward run, a series of support shelves projecting from said endless conveyor, means for so traversing said endless conveyor in step-by-step fashion that the shelves on said forward run ascend and the shelves on the rearward run descend, a casing enclosing said conveyor and said shelves and having a delivery opening disposed adjacent said forward run for removing articles supported on the ones of said shelves ascending on said forward run each of said shelves being formed with a rearward support section secured to said endless conveyor, a forward section hinged to said rearward section, and means for retaining the support surfaces of said sections in a substantially common plane as said shelves ascend on said forward run, and said machine further comprising means for pivotally deflecting said forward section downwardly relative to said rearward section as each shelf is carried around the top of said endless conveyor and means for retaining said forward section in its deflected position as it descends along said rearward run.

References Cited by the Examiner

UNITED STATES PATENTS

| 1,025,978 | 5/1912 | Herman | 312—97 |
| 1,876,510 | 9/1932 | Morrison | 312—97 |
| 2,003,821 | 6/1935 | Blake | 108—112 |
| 3,057,512 | 10/1962 | Schurtz | 221—77 |

CLAUDE A. LE ROY, *Primary Examiner.*

JOHN PETO, *Examiner.*